United States Patent
Chae et al.

(10) Patent No.: US 9,628,995 B2
(45) Date of Patent: Apr. 18, 2017

(54) COGNITIVE RADIO APPARATUS AND METHOD FOR PERFORMING SPECTRUM SENSING AND COMPARISON BETWEEN SPECTRUM SUB-PERIODS

(71) Applicant: RESEARCH & BUSINESS FOUNDATION SUNGKYUNKWAN UNIVERSITY, Suwon-si (KR)

(72) Inventors: Keunhong Chae, Suwon-si (KR); Seokho Yoon, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 67 days.

(21) Appl. No.: 14/339,675

(22) Filed: Jul. 24, 2014

(65) Prior Publication Data

US 2015/0031309 A1 Jan. 29, 2015

(30) Foreign Application Priority Data

Jul. 24, 2013 (KR) .................. 10-2013-0087119

(51) Int. Cl.
*H04W 16/14* (2009.01)
*H04W 72/08* (2009.01)
*H04W 24/08* (2009.01)

(52) U.S. Cl.
CPC ......... *H04W 16/14* (2013.01); *H04W 72/082* (2013.01); *H04W 24/08* (2013.01)

(58) Field of Classification Search
CPC .... H04W 16/14; H04W 72/082; H04W 24/08
See application file for complete search history.

(56) References Cited

U.S. PATENT DOCUMENTS

| | | | | |
|---|---|---|---|---|
| 2003/0224741 A1* | 12/2003 | Sugar | .................. | H04W 16/14 455/115.1 |
| 2008/0069079 A1* | 3/2008 | Jacobs | ............... | H04W 72/085 370/348 |
| 2008/0273633 A1* | 11/2008 | Conrad | ............... | H04L 27/2647 375/343 |
| 2009/0247201 A1* | 10/2009 | Ye | ......................... | H04W 16/14 455/509 |
| 2009/0325482 A1* | 12/2009 | Zhou | .................... | H04W 16/14 455/25 |
| 2010/0081387 A1* | 4/2010 | Shi | ...................... | H04B 17/318 455/62 |

(Continued)

OTHER PUBLICATIONS

Quan, Zhi, et al. "Optimal multiband joint detection for spectrum sensing in cognitive radio networks." Signal Processing, IEEE Transactions on 57.3 (2009): 1128-1140.

(Continued)

*Primary Examiner* — Devan Sandiford

(57) ABSTRACT

A method of spectrum sensing and an apparatus for spectrum sensing are provided. A method of spectrum sensing involves partitioning, by a processor, a spectrum sensing section into a plurality of sub-periods each having a same size, performing energy detection in each of the plurality of sub-periods, and determining whether a primary user's signal is present in the spectrum sensing section based on presence of a primary user's signal in each of the plurality of sub-periods and a test statistic in each of the plurality of sub-periods.

19 Claims, 5 Drawing Sheets

(56) References Cited

U.S. PATENT DOCUMENTS

2010/0240407 A1* 9/2010 Park .................. H04W 72/00
                                                    455/512
2011/0028097 A1* 2/2011 Memik .............. H04W 72/085
                                                    455/62

OTHER PUBLICATIONS

Cho, Hyung-Weon, et al. "An Order Statistic-Based Spectrum Sensing Scheme for Cooperative Cognitive Radio Networks in Non-Gaussian Noise Environments."; 2012 (9 pages, in Korean, with English language abstract).

* cited by examiner

COGNITIVE RADIO APPARATUS AND METHOD FOR PERFORMING SPECTRUM SENSING AND COMPARISON BETWEEN SPECTRUM SUB-PERIODS

CROSS-REFERENCE TO RELATED APPLICATION

This application claims the benefit under 35 USC 119(a) of Korean Patent Application No. 10-2013-0087119 filed on Jul. 24, 2013, in the Korean Intellectual Property Office, the entire disclosure of which is incorporated herein by reference for all purposes.

BACKGROUND

1. Field

The following description relates to a method of determining presence of a primary user's signal through spectrum sensing, and a spectrum sensing apparatus using the same.

2. Description of Related Art

A cognitive radio (CR) communication system based on dynamic spectrum allocation has received much attention as a solution to a lack of frequency resources. With respect to a spectrum band allocated to a primary user, a CR communication system allows a secondary user to perform a communication in a spectrum band in the absence of a primary user's signal. Accordingly, a spectrum sensing scheme for precisely detecting the presence of a primary user is an important feature in implementing the CR communication system.

An example of the spectrum sensing scheme includes an energy detection method. The energy detection method is easy to implement and does not require prior information about a primary user's signal.

Most studies on the spectrum sensing schemes have been conducted in a circumstance that assumes one of two scenarios: the presence of a primary user's signal and the absence of the primary user's signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of spectrum sensing involves partitioning, by a processor, a spectrum sensing section into a plurality of sub-periods each having a same size; performing energy detection in each of the plurality of sub-periods; and determining whether a primary user's signal is present in the spectrum sensing section based on presence of a primary user's signal in each of the plurality of sub-periods and a test statistic in each of the plurality of sub-periods.

The energy detection may be performed using an antenna of a secondary user terminal.

The plurality of sub-periods may be partitioned in the order of sensing time, starting from a sub-period 1 to a sub-period N (N is a natural number).

The determining of whether a primary user's signal is present in the spectrum sensing section may involve: determining that a primary user's signal is absent in the spectrum sensing section if a primary user' signal is absent in the sub-period N; and determining that a primary user's signal is present in the spectrum sensing section if a primary user' signal is present in the sub-period N.

In response to a determination that a primary user' signal is present in the sub-period 1 and a primary user' signal is present in the sub-period N, a test statistic $T_1$ in the sub-period 1 may be compared with a test statistic $T_N$ in the sub-period N, and in response to $T_1$ being larger than $T_N$, it may be determined that a primary user's signal is absent in the spectrum sensing section, and in response to $T_1$ being equal to or smaller than $T_N$, it may be determined that a primary user's signal is present in the spectrum sensing section.

The plurality of sub-periods may include a sub-period 1 and a sub-period 2 arranged in the order of sensing time.

The determining of whether a primary user's signal is present in the spectrum sensing section may involve: determining that a primary user's signal is absent in the spectrum sensing section if a primary user' signal is absent in the sub-period 2; and determining that a primary user's signal is present in the spectrum sensing section if a primary user' signal is present in the sub-period 2.

In response to a determination that a primary user' signal is present in the sub-period 1 and a primary user' signal is present in the sub-period 2, a test statistic in the sub-period 1 $T_1$ may be compared with a test statistic $T_2$ in the sub-period 2, and in response to $T_1$ being larger than $T_2$, it may be determined that a primary user's signal is absent in the spectrum sensing section, and in response to $T_1$ being equal to or smaller than $T_2$, it may be determined that a primary user's signal is present in the spectrum sensing section.

In another general aspect, there is provided an apparatus for performing spectrum sensing, the apparatus including a processor configured to partition a spectrum sensing section partitioned into a plurality of sub-periods each having a same size, and to determine presence of a primary user's signal in the spectrum sensing section based on presence of a primary user's signal in each of the plurality of sub-periods and a test statistic in each of the plurality of sub-periods.

The general aspect of the apparatus may include an antenna configured to detect the presence of the primary user's signal.

The plurality of sub-periods may be partitioned in the order of sensing time, starting from a sub-period 1 to a sub-period N (N is a natural number).

The processing unit may be configured to: determine that a primary user's signal is absent in the spectrum sensing section in response to a determination that a primary user' signal is absent in the sub-period N; and determine that a primary user's signal is present in the spectrum sensing section in response to a determination that a primary user' signal is present in the sub-period N.

In response to a primary user' signal being present in the sub-period 1 and a primary user' signal is present in the sub-period N, the secondary user terminal may be configured to compare a test statistic $T_1$ in the sub-period 1 with a test statistic $T_N$ in the sub-period N, and in response to a determination that $T_1$ is larger than $T_N$, determine that a primary user's signal is absent in the spectrum sensing section, and in response to a determination that $T_1$ is equal to or smaller than $T_N$, determine that a primary user's signal is present in the spectrum sensing section.

In another general aspect, there is provided a non-transitory recording medium storing an instruction that causes a computer to perform the method described above.

Other features and aspects will be apparent from the following detailed description, the drawings, and the claims.

Figure 1:
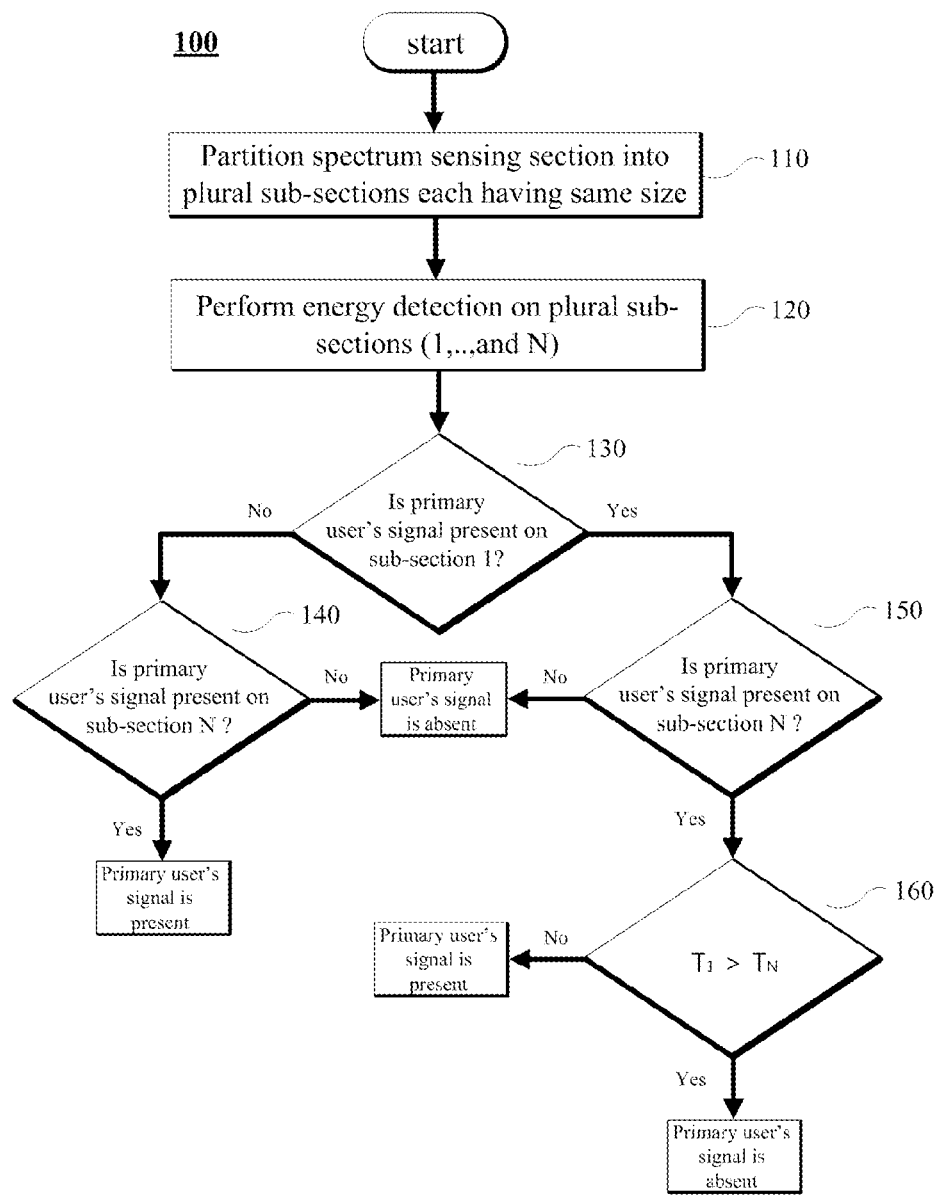
FIG. 1 is a flowchart illustrating an example of a method of determining presence of a primary user's signal through spectrum sensing.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

An actual CR system may encounter a primary user traffic having a primary user's signal randomly arriving or departing during the time duration of a sensing operation. Such an occurrence of the traffic may degrade the performance of the conventional spectrum sensing method.

The following description is related to a technology for determining the presence of a primary user's signal by dividing a spectrum sensing section into a plurality of sensing sections, and using information on whether a primary user's signal is present and test statistics for the plurality of sensing sections.

A signal that is received by a spectrum sensing apparatus while a primary user's signal is randomly changed during a spectrum sensing section may be expressed as Equation 1 and Equation 2. $H_0$ represents a case in which a primary user's signal is absent after the spectrum sensing section, and $H_1$ represents a case in which a primary user's signal is present after the spectrum sensing section.

$$H_0 : y[n] = \begin{cases} x[n] + w[n], & \text{for } n = 1, 2, \ldots, J_0, \\ w[n] & \text{for } n = J_0 + 1, J_0 + 2, \ldots, N \end{cases} \quad \text{[Equation 1]}$$

$$H_1 : y[n] = \begin{cases} w[n] & \text{for } n = 1, 2, \ldots, J_1, \\ x[n] + w[n], & \text{for } n = J_1 + 1, J_1 + 2, \ldots, N \end{cases} \quad \text{[Equation 2]}$$

where N is the number of observed samples, $x[n]$ is a sample of a primary user's signal having an average of 0 and transmitted, $y[n]$ is a sample of a received signal, and $w[n]$ is an additive white Gaussian noise (AWGN) having an average of 0 and a variance of $\sigma^2$.

$H_0$ represents a circumstance in which a primary user's signal randomly disappears between a sample $n=J_0$ and a sample $n=J_0+1$, and $H_1$ represents a circumstance in which a primary user's signal randomly appears between a sample $n=J_1$ and a sample $n=J_1+1$.

In Equations 1 and 2, $J_0=0$ represents a case in which a primary user's signal is absent during a sensing section, and $J_1=0$ represents a case in which a primary user's signal is present during a sensing section, as in a signal model assumed according to the conventional spectrum sensing scheme.

As shown in Equations 1 and 2, modeling a circumstance in which a primary user's traffic is present is performed with respect to two circumstances. The two circumstances are (1) the departure of a primary user's signal and (2) the arrival of a primary user's signal. Meanwhile, it is assumed that the departure and arrival of a primary user's signal occurs only one time.

FIG. 1 illustrates a flowchart of an example of a method (100) of determining the presence of a primary user's signal through spectrum sensing.

The method of determining presence of a primary user's signal through spectrum sensing involves partitioning a spectrum sensing section into a plurality of sub-periods each having a same size (110), performing energy detection in each of the plurality of sub-periods (120), and determining whether a primary user's signal is present in the spectrum sensing section based on presence of a primary user's signal in each of the plurality of sub-periods and a test statistic in each of the plurality of sub-periods (130 to 160). Each operation is performed by a spectrum sensing apparatus.

The spectrum sensing section is partitioned into the plurality of sub-periods starting from a sub-period 1 to a sub-period N (N is a natural number equal to or larger than 2) in the order of sensing time.

First, it is determined whether a primary user's signal is present in a sub-period 1 (130), and if a primary user's signal is absent in the sub-period 1, it is determined whether a primary user's signal is present in a sub-period N (140). If a primary user's signal is absent even in the sub-period N, it is determined that a primary user's signal is absent in the spectrum sensing section. If a primary user's signal is present in the sub-period N, it is determined that a primary user's signal is present in the spectrum sensing section.

If a primary user's signal is present in the sub-period 1, it is determined whether a primary user's signal is present in the sub-period N (150). If it is determined that a primary user's signal is absent in the sub-period N, a primary user's signal is determined to be absent in the spectrum sensing section. If a primary user's signal is present in the sub-period N, a test statistic $T_1$ in the sub-period 1 is compared with a test statistic $T_N$ in the sub-period N. If $T_1$ is larger than $T_N$, it is determined that a primary user's signal is absent in the spectrum sensing section. If $T_1$ is equal to or smaller than $T_N$, it is determined that a primary user's signal is present in the spectrum sensing section.

Although the above method shown in FIG. 1 determines the presence of a primary user's signal in the sub-period 1 first, the example is not limited thereto. That is, if the presence of a primary user's signal in the sub-period N is determined first, the number of operations may be reduced. When a total of N sub-periods is provided in the determining of presence of a primary user's signal in the spectrum sensing section, it is determined that a primary user's signal is absent in the spectrum sensing section if a primary user's signal is absent in the sub-period N. On the other hand, it is determined that a primary user's signal is present in the spectrum sensing section if a primary user's signal is present in the sub-period N.

When a primary user's signal is present in the sub-period 1 and a primary user's signal is present in the sub-period N, the likelihood of the presence of a primary user's signal is determined by using test statistics of energy detection in the sub-period 1 and the sub-period N.

In detail, a test statistic $T_1$ of the sub-period 1 is compared with a test statistic $T_N$ of the sub-period N. In response, if $T_1$ is larger than $T_N$, it is determined a primary user's signal is absent in the spectrum sensing section. If $T_1$ is smaller than $T_N$, it is determined a primary user's signal is present in the spectrum sensing section. In addition, if $T_1$ is equal to $T_N$, it may be determined that a primary user's signal is present in the spectrum sensing section. The test statistics may range from $\{T_1, \ldots$ and $T_N\}$.

In the example described herein, the spectrum sensing section is partitioned into two sub-periods. However, the present disclosure is not limited thereto. First, N observed samples are divided into two sub-periods each consisting of N/2 observed samples (N is an even number). A test statistic is obtained for each sub-period by use of energy detection in each sub-period, to determine the presence of a primary user's signal.

Figure 2:
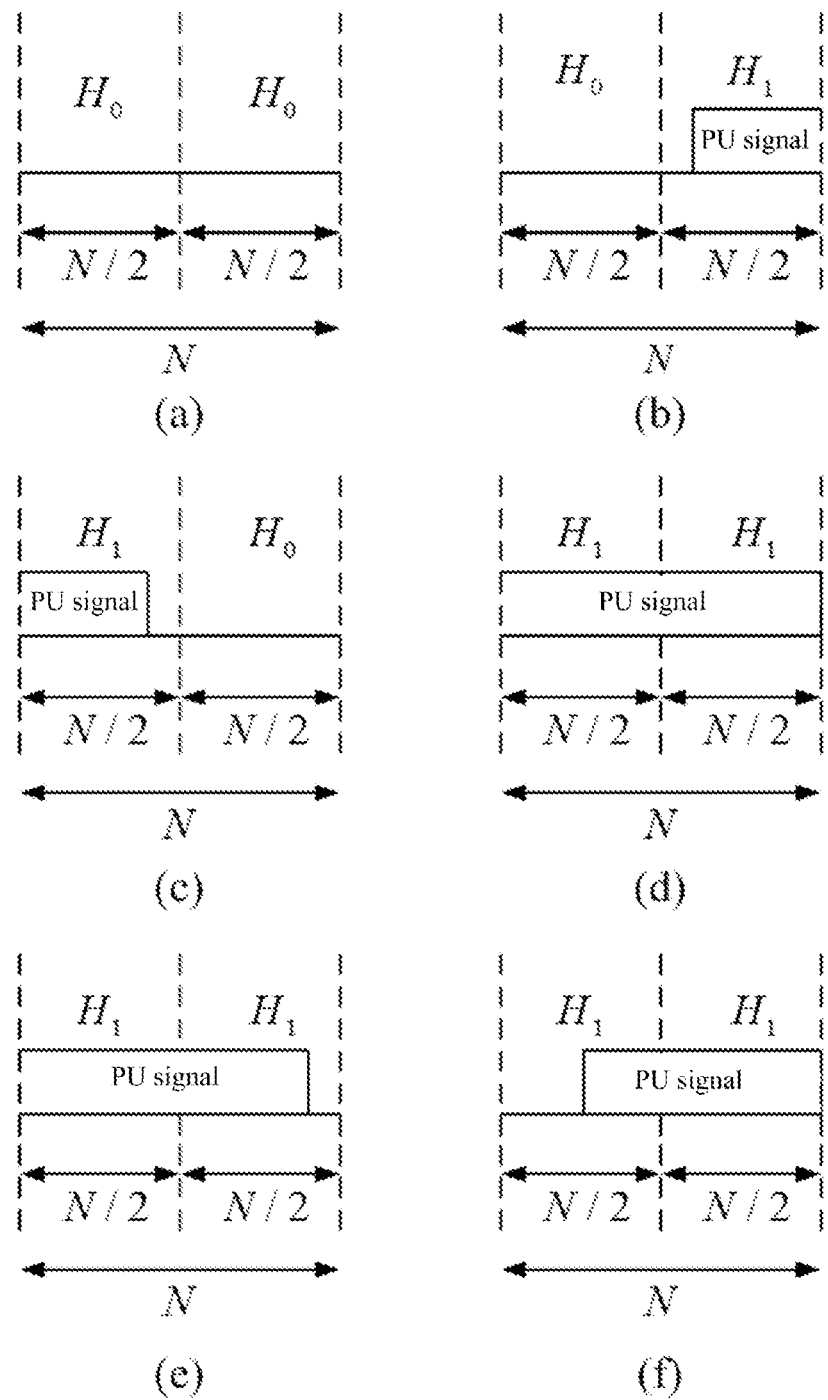
FIG. 2 is a diagram illustrating an example of a traffic of a primary user when a spectrum sensing section is divided into two sensing sections.

In this example, spectrum sensing is performed in the same manner as the conventional energy detection scheme in which energy of a received signal in each sub-period is detected, the energy is used as a test statistic, and an energy corresponding to a case having only noise is set as a threshold value. The energy may be detected, for example, by the use of an antenna of a terminal FIG. 2 illustrates a diagram of an example of a traffic of a primary user when a spectrum sensing section is divided into two sensing sections. There are a total of six cases possible with regard to the presence and absence of a primary user's traffic.

As shown in (a) of FIG. 2, if a primary signal is absent in the sub-period 1 and a primary signal is absent in the sub-period 2, that is, the sub-period 1 is $H_0$ and the sub-period 2 is also $H_0$, it is determined that a primary user's signal is absent.

In (b) of FIG. 2, the sub-period 1 is $H_0$ and the sub-period 2 is $H_1$, indicating that a primary user's signal has arrived in the middle of the spectrum. Thus, a primary user's signal is determined to be present in the spectrum.

In (c) of FIG. 2, the sub-period 1 is $H_1$, and the sub-period 2 is $H_0$, indicating that a primary user's signal has departed in the middle of the spectrum. Thus, a primary user's signal is determined to be absent.

As shown in (e) and (f) of FIG. 2, if the sub-period 1 is $H_1$ and the sub-period 2 is also $H_1$, test statistics on the respective sections are compared with each other. The determination is performed according to Equation 3 that follows.

$$T_1 \overset{H_1}{\underset{H_0}{\lessgtr}} T_2,$$ [Equation 3]

where $T_1$ is a test statistic in a sub-period 1, and $T_2$ is a test statistic in a sub-period 2.

The test statistic $T_1$ in the sub-period 1 is compared with the test statistic $T_2$ in the sub-period 2. If the test statistic $T_1$ in the sub-period 1 is larger than the test statistic $T_2$ in the sub-period 2 as in (e) of FIG. 2, it is determined that a primary user's signal is absent in the spectrum sensing section. If the test statistic $T_1$ in the sub-period 1 is equal to or smaller than the test statistic $T_2$ in the sub-period 2 as in (f) of FIG. 2, it is determined that a primary user's signal is present in the spectrum sensing section. In addition, as shown in (d) of FIG. 2, if the sub-period 1 is $H_1$ and the sub-period 2 is also $H_1$, it is determined that a primary user's signal is present, on the assumption that a departure and arrival of a primary user's signal in the spectrum sensing section occurs only one time.

Figure 3:
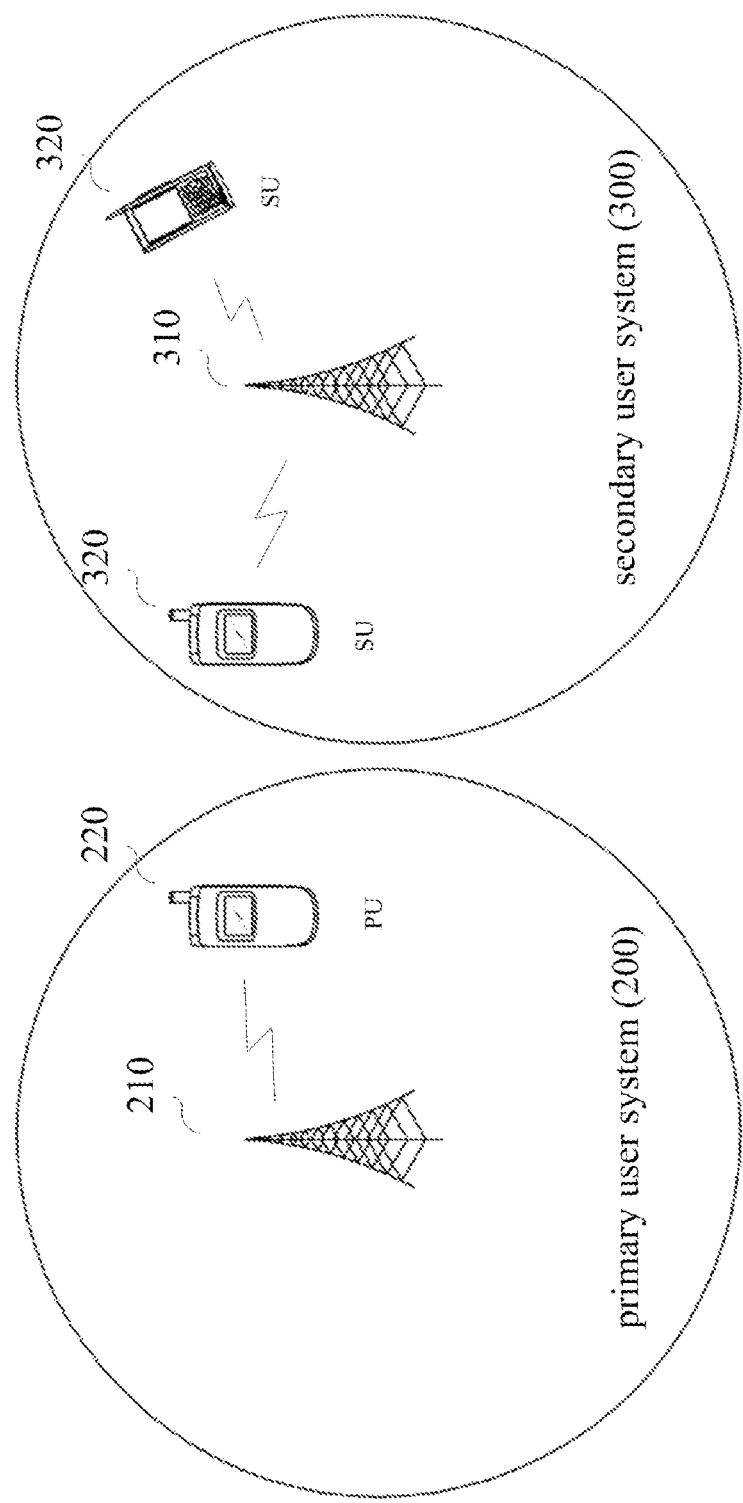
FIG. 3 is a diagram illustrating an example of a cognitive radio communication system.

FIG. 3 illustrates a diagram of an example of a cognitive radio communication system.

Referring to FIG. 3, a secondary user system 300 includes a secondary user base station 310 and a secondary user terminal (SU) 320, and a primary user system 200 includes a primary user base station 210 and a primary user terminal (PU) 220.

The secondary user terminal 320 may be a mobile device, a cellular phone, a smart phone, a wearable smart device, a personal computer, a tablet personal computer, a global positioning system navigation, and the like. The secondary user terminal 320 may be capable of wireless communication or network communication consistent with that disclosed herein. The secondary user terminal 320 may include a display screen, a key board, buttons, or an input/output device such as a touch screen for inputting data from a user and/or displaying data to a user. The secondary user terminal 320 may further include a processor, a controller, a memory, an antenna, a transceiver, a transmitter, a receiver, and the like.

The secondary user system 300 may recognize all or a part of frequency resources allocated to the primary user system 200 as available frequency resources by using a cognitive radio communication technology. The secondary user base station 310 and the secondary user (SU) terminal 320 included in the secondary user system 300 may transmit/receive data with each other by using the recognized available frequency resources.

In this example, in the event that the primary user system 200 and the secondary user system 300 are using the same frequency resources, a collision may occur between the primary user system 200 and the secondary user system 300. However, the primary user system 200 has a priority on the frequency resources allocated to the primary user system 200 over the secondary user system 300.

Accordingly, the secondary user system 300 may use all or a part of the frequency resources allocated to the primary user system 200 within limits ensuring the secondary user system 300 not to interfere with communication of the primary user system 200. Accordingly, the secondary user base station 310 and the secondary user terminal 320 sense signals of the primary user system 200, and according to a result of the sensing, perform data communication. For example, in the event that a signal of the primary user system 200 is absent, or in the event that an interference is occurring in the primary user system 200 due to the data communication of the secondary user base station 310 and the secondary user terminal 320 being below a predetermined level, the secondary user base station 310 and the secondary user terminal 320 may use all or a part of the frequency resources allocated to the primary user system 200.

In this example, the spectrum sensing apparatus includes the secondary user terminal 320 and/or the secondary user base station 310. With respect to a spectrum sensing section partitioned into a plurality of sub-periods each having the same size, the secondary user terminal 320 or the secondary user base station 310 may determine whether a primary user's signal is present in the spectrum sensing section based on the presence of a primary user's signal in each sub-period and a test statistic in each sub-period. The secondary user terminal 320 used by a secondary user may independently perform the spectrum sensing. In the alternative, the secondary user base station 310 communicating with the secondary user terminal 320 may perform the spectrum sensing. In yet another example, the secondary user terminal 320 and the secondary user base station 310 may perform the spectrum sensing in cooperation with each other. The spectrum sensing may be achieved in various schemes depending on standards for performing the spectrum sensing.

The method of analyzing the result of spectrum sensing is achieved in the same manner as the method of determining presence of a primary user's signal through spectrum sensing. A plurality of sub-periods is partitioned starting from a sub-period 1 to a sub-period N in the order of sensing time. The analyzing and the partitioning may be performed by a processor of the secondary user terminal 320.

The secondary user terminal 320 or the secondary user base station 310 determines that a primary user's signal is absent in the spectrum sensing section if a primary user's signal is absent in the sub-period N, and determines that a primary user's signal is present in the spectrum sensing section in the event that a primary user's signal is present in the sub-period N.

If a primary user's signal is present in the sub-period 1 and a primary user's signal is present in the sub-period N, the secondary user terminal 320 or the secondary user base station 310 compares a test statistic $T_1$ in the sub-period 1 with a test statistic $T_N$ in the sub-period N. In the event that $T_1$ is determined to be larger than $T_N$, the spectrum sensing apparatus determine that a primary user's signal is absent in the spectrum sensing section. In the event that $T_1$ is determined to be equal to or smaller than $T_N$, the spectrum sensing apparatus determines that a primary user's signal is present in the spectrum sensing section.

Hereinafter, an experiment verifying the effect of the determining method through spectrum sensing will be described.

In the experiment for verifying the performance, the detection probability performance according to a signal-to-noise ratio (SNR) is compared. The number of observed samples is set to N=200, and a false alarm probability is $P_{fa}=0.05$. In the simulation, the SNR is defined as $\sigma_s^2/\sigma_n^2$, and $\sigma_s^2$ and $\sigma_n^2$ represent a variance of a PU signal and a variance of noise, respectively.

The detection probability is defined as Pr ($H_1|H_0$). Accurate detection of a signal randomly arriving within a sensing section is important in preventing interferences to a primary user. Accordingly, the actual simulation is provided to figure out the detection probability performance in the event that the proposed determining rule is used for the circumstance of $H_1$. In the circumstance of $H_1$, a primary user's signal randomly arrives in the sensing section, and the arrival time is modeled to J1, which is assumed to have a uniform distribution in the sensing section.

In the energy detection of the conventional determining rule through spectrum sensing, the energy of a received signal in a sensing section is measured so as to be used as a test statistic. Thereafter, the test statistic is compared with a threshold that is set according to a false alarm probability. In the event that the test statistic is larger than the threshold, the circumstance is determined to $H_1$. In the event that the test statistic is smaller than the threshold, the circumstance is determined to $H_0$.

Figure 4:
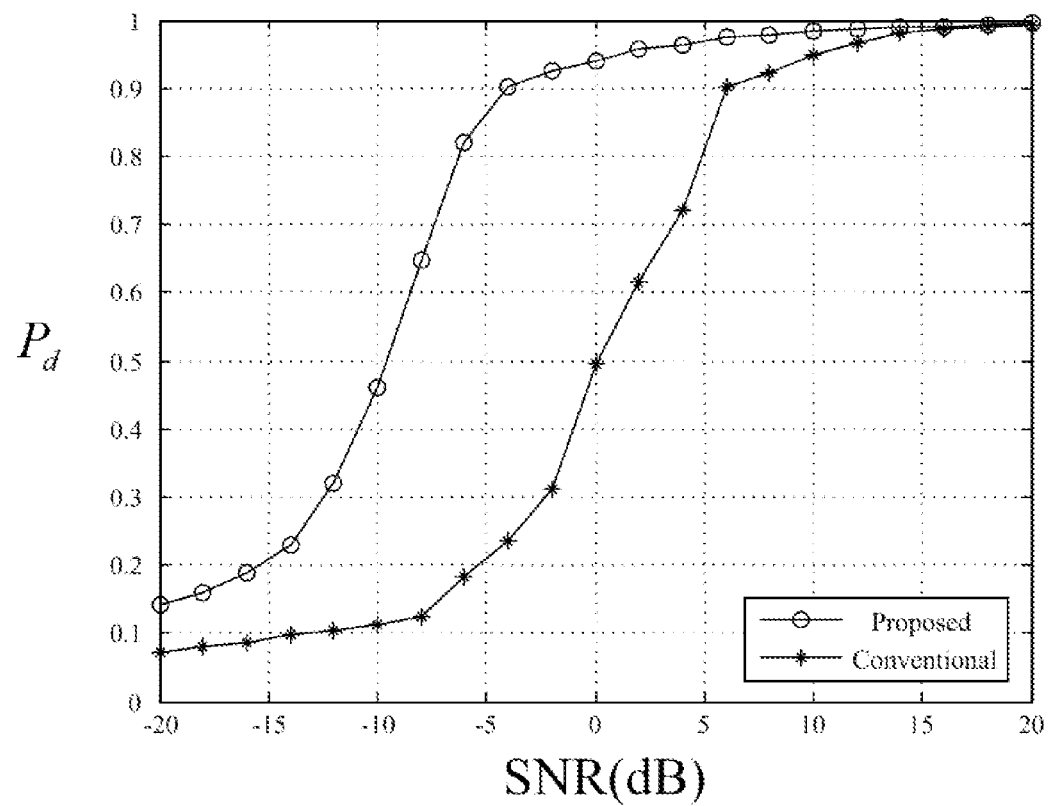
FIG. 4 is a diagram illustrating an experiment on a detection probability in accordance with a conventional method and a detection probability in accordance with performing energy detection in each of the plurality of sub-periods.

FIG. 4 is a diagram illustrating the result of an experiment on a detection probability obtained according to a conventional determination method of determining the presence of a user signal, and the result of an experiment on a detection probability obtained according to a proposed determination method of determining the presence of a user signal according to the present disclosure. FIG. 4 illustrates a detection probability $P_d$ according to SNR. Referring to FIG. 4, for the same SNR, the above described determination method exhibits a superior detection probability performance in comparison to the conventional determining method. The above described determination method provides an improved detection probability performance with a low complexity in comparison to the conventional technology, by partitioning a spectrum sensing section and performing energy detection in each sub-period of the spectrum sensing section.

Figure 5:
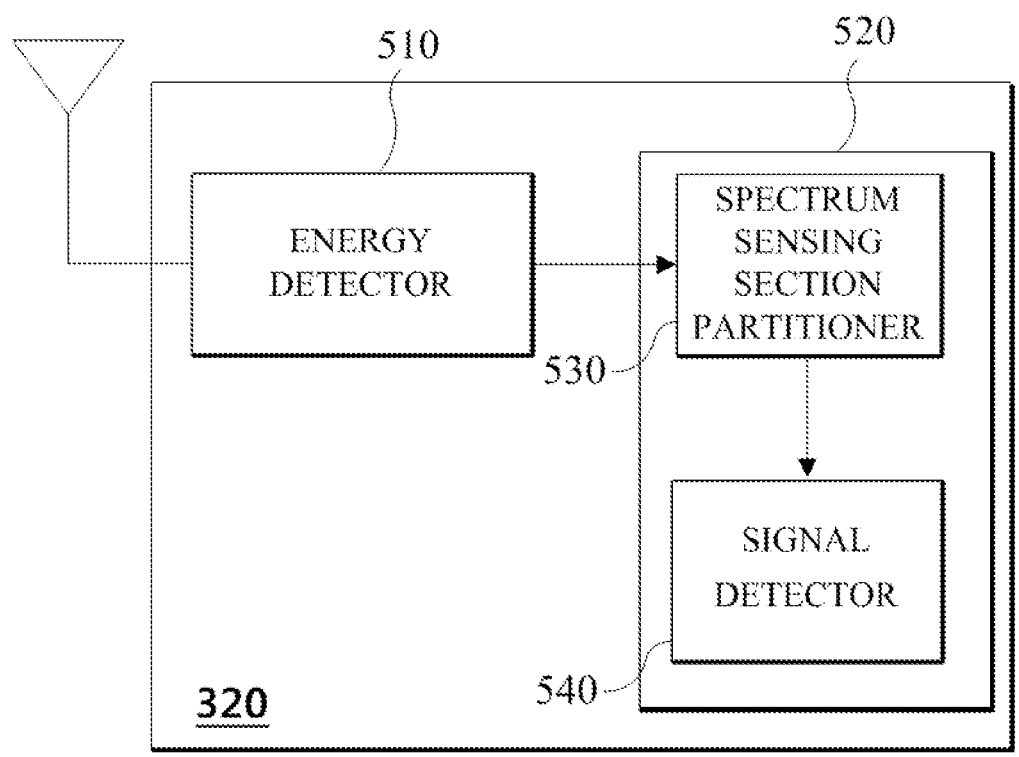
FIG. 5 is a diagram illustrating an example of a spectrum sensing apparatus for use in a cognitive radio communication system.

FIG. 5 illustrates an example of a spectrum sensing apparatus for use in a cognitive radio communication system.

The spectrum sensing apparatus may perform spectrum sensing as a secondary user terminal 320 in a cognitive radio communication system.

The spectrum sensing apparatus includes an energy detector 510 configured to detect the environment via an antenna and provide environmental information to a processor 520.

The processor 520 includes a spectrum sensing section partitioner 530 that partitions a spectrum sensing section that is being sensed into a plurality of sub-periods each having a same size and a signal detector that determines the presence of a primary user terminal's signal in the spectrum sensing section based on presence of a primary user's signal in each of the plurality of sub-periods and a test statistic in each of the plurality of sub-periods. The test statistic is generated by the processor 520 based on the environmental information received via the antenna.

The descriptions of a spectrum sensing apparatus provided with reference to FIGS. 1-4 apply to the spectrum sensing apparatus illustrated in FIG. 5, and repetitive descriptions are omitted for conciseness.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A terminal may include a display screen, a key board, buttons, or an input/output device such as a touch screen for inputting data and displaying data from a user. A terminal may also include an antenna, a transceiver, transmitter, or receiver and the like to receiving wireless communication. A terminal with a significant local programmable data processing capability may be referred to as a smart terminal or fat client. A terminal that depends on the host computer or host computing system for its processing power may be referred to as a thin client. A personal computer can run software that emulates the function of a terminal, sometimes allowing concurrent use of local programs and access to a distant terminal host system.

The various units and modules described above may be implemented using one or more hardware components. The hardware component may be, for example, a physical device that physically performs one or more operations, but is not limited thereto. Examples of the hardware components include microphones, antenna, receiver, amplifiers, low-pass filters, high-pass filters, band-pass filters, analog-to-digital converters, digital-to-analog converters, and processing devices.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of spectrum sensing, the method comprising:
   partitioning, by a processor, a spectrum sensing section into sub-periods each having a same size;
   performing energy detection in each of the sub-periods; and
   determining whether a primary user's signal is present in the spectrum sensing section based on presence of a primary user's signal in each of the sub-periods and a result of the energy detection in each of the sub-periods,
   wherein the determining whether a primary user's signal is present in the spectrum sensing section predicts whether the primary user's signal will continue to be present based on a comparison between the enemy levels detected in the sub-periods.

2. The method of claim 1, wherein the energy detection is performed using an antenna of a secondary user terminal.

3. The method of claim 2, wherein the sub-periods include a sub-period 1 and a sub-period 2 arranged in the order of sensing time.

4. The method of claim 3, wherein the determining of whether a primary user's signal is present in the spectrum sensing section comprises:
   determining that a primary user's signal is absent in the spectrum sensing section in response to a primary user's signal being absent in the sub-period 2; and determining that a primary user's signal is present in the spectrum sensing section in response to a primary user's signal being present in the sub-period 2.

5. The method of claim 3, wherein in response to a determination that a primary user's signal is present in the sub-period 1 and a primary user's signal is present in the sub-period 2, value of the energy detection in the sub-period 1 $T_1$ is compared with value of the energy detection $T_2$ in the sub-period 2, and in response to $T_1$ being larger than $T_2$, it is determined that a primary user's signal is absent in the spectrum sensing section, and in response to $T_1$ being equal to or smaller than $T_2$, it is determined that a primary user's signal is present in the spectrum sensing section.

6. The method of claim 1, wherein the sub-periods are partitioned in the order of sensing time, starting from a sub-period 1 to a sub-period N (N is a natural number).

7. The method of claim 6, wherein the determining of whether a primary user's signal is present in the spectrum sensing section comprises:
determining that a primary user's signal is absent in the spectrum sensing section in response to a primary user's signal being absent in the sub-period N; and
determining that a primary user's signal is present in the spectrum sensing section in response to a primary user's signal being present in the sub-period N.

8. The method of claim 6, wherein in response to a determination that a primary user's signal is present in the sub-period 1 and a primary user's signal is present in the sub-period N, value of the energy detection $T_1$ in the sub-period 1 is compared with value of the energy detection $T_N$ in the sub-period N, and in response to $T_1$ being larger than $T_N$, it is determined that a primary user's signal is absent in the spectrum sensing section, and in response to $T_1$ being equal to or smaller than $T_N$, it is determined that a primary user's signal is present in the spectrum sensing section.

9. The method of claim 6, wherein in response to a determination that a primary user's signal is present in the sub-period 1 and a primary user's signal is present in the sub-period N, a secondary user terminal is configured to compare value of the energy detection $T_1$ in the sub-period 1 with value of the energy detection $T_N$ in the sub-period N, and in response to a determination that $T_1$ is larger than $T_N$, determine that a primary user's signal is absent in the spectrum sensing section, and in response to a determination that $T_1$ is equal to or smaller than $T_N$, determine that a primary user's signal is present in the spectrum sensing section.

10. The method of claim 1, further comprising: transmitting data, by the processor, in response to determining that the primary user's signal is not present in the spectrum.

11. An apparatus for performing spectrum sensing, the apparatus comprising:
a processor configured to partition a spectrum sensing section partitioned into sub-periods each having a same size, and to determine presence of a primary user's signal in the spectrum sensing section based on presence of a primary user's signal in each of the sub-periods and a result value of the energy detection in each of the sub-periods, wherein the determining whether a primary user's signal is present in the spectrum sensing section predicts whether the primary user's signal will continue to be present based on a comparison between the energy levels detected in the sub-periods.

12. The apparatus of claim 11, wherein the apparatus comprises an antenna configured to detect the presence of the primary user's signal.

13. The apparatus of claim 11, wherein the sub-periods are partitioned in the order of sensing time, starting from a sub-period 1 to a sub-period N (N is a natural number).

14. The apparatus of claim 13, wherein the processor is configured to:
determine that a primary user's signal is absent in the spectrum sensing section in response to a determination that a primary user's signal is absent in the sub-period N; and
determine that a primary user's signal is present in the spectrum sensing section in response to a determination that a primary user's signal is present in the sub-period N.

15. The apparatus of claim 13, wherein:
in response to a primary user's signal being present in the sub-period 1 and a primary user's signal is present in the sub-period N, a secondary user terminal is configured to compare value of the energy detection $T_1$ in the sub-period 1 with value of the energy detection $T_N$ in the sub-period N, and in response to a determination that $T_1$ is larger than $T_N$, determine that a primary user's signal is absent in the spectrum sensing section, and in response to a determination that $T_1$ is equal to or smaller than $T_N$, determine that a primary user's signal is present in the spectrum sensing section.

16. The apparatus of claim 11, wherein the processor is further configured to transmit data in response to determining that the primary user's signal is not present in the spectrum.

17. A non-transitory computer-readable medium storing instructions that, when executed by a processor, cause the processor to perform the method of claim 1.

18. A method of spectrum sensing, the method comprising:
partitioning, by a processor, a spectrum sensing section into sub-periods, each having a same size comprising a first sub-period and a second sub-period;
performing energy detection in each of the sub-periods;
determining that a primary user's signal is present in the first sub-period and the second sub-period;
determining that the primary user's signal is present in the spectrum in response to the energy detected in the first sub-period exceeding the energy detected in the second sub-period; and
determining that the primary user's signal is not present in the spectrum in response to the energy detected in the second sub-period exceeding the energy detected in the first sub-period.

19. The method of claim 18, further comprising: transmitting data, by the processor, in response to determining that the primary user's signal is not present in the spectrum.

* * * * *